US011044885B2

(12) United States Patent
Ruggiano

(10) Patent No.: US 11,044,885 B2
(45) Date of Patent: Jun. 29, 2021

(54) PORTABLE ANIMAL LITTER SYSTEM

(71) Applicant: Laurel Joy Ruggiano, Boynton Beach, FL (US)

(72) Inventor: Laurel Joy Ruggiano, Boynton Beach, FL (US)

( * ) Notice: Subject to any disclaimer, the term of this patent is extended or adjusted under 35 U.S.C. 154(b) by 39 days.

(21) Appl. No.: 15/919,306

(22) Filed: Mar. 13, 2018

(65) Prior Publication Data
US 2018/0263209 A1   Sep. 20, 2018

Related U.S. Application Data

(60) Provisional application No. 62/472,149, filed on Mar. 16, 2017.

(51) Int. Cl.
*A01K 1/01* (2006.01)
*A01K 1/02* (2006.01)

(52) U.S. Cl.
CPC .......... *A01K 1/0125* (2013.01); *A01K 1/0245* (2013.01)

(58) Field of Classification Search
CPC .... A01K 1/0125; A01K 1/0236; A01K 1/035; A01K 1/0353
See application file for complete search history.

(56) References Cited

U.S. PATENT DOCUMENTS

| | | | | |
|---|---|---|---|---|
| 3,991,507 A * | 11/1976 | Bart | ....................... | A01K 97/06 43/54.1 |
| 4,974,265 A * | 12/1990 | Maggio | .................. | A47K 3/325 135/901 |
| 5,709,171 A * | 1/1998 | Moore, III | ........... | A01K 1/0107 119/167 |
| 5,862,932 A * | 1/1999 | Walsh | .................. | B65D 21/086 220/484 |
| 5,938,023 A * | 8/1999 | Herron | ................... | B25H 3/023 206/315.11 |
| 7,484,475 B2 * | 2/2009 | Milliner | ............... | A01K 5/0225 119/52.1 |
| 8,539,911 B1 * | 9/2013 | Landrum | ............... | A01K 1/033 119/168 |
| 8,991,599 B2 * | 3/2015 | Wilson | ................... | B25H 3/026 108/145 |
| 2006/0071519 A1 * | 4/2006 | Heide | .................... | A01K 1/035 297/219.1 |
| 2007/0163511 A1 * | 7/2007 | Dietz | ..................... | A01K 1/033 119/479 |
| 2009/0308225 A1 * | 12/2009 | Natali | .................. | G10D 13/028 84/411 R |
| 2010/0282175 A1 * | 11/2010 | Bjornson | ............. | A01K 1/0125 119/168 |

* cited by examiner

*Primary Examiner* — Thanh Pham
(74) *Attorney, Agent, or Firm* — The Plus IP Firm; Derek Fahey; Jason Barton

(57) ABSTRACT

In one embodiment, a portable animal litter system is disclosed. The system includes a base container having a perimeter wall protruding substantially upward from a perimeter of a bottom panel. A plurality of looped inner walls is positioned concentrically so that the looped inner walls are in a telescoping arrangement. In a fully collapsed state, the looped inner walls are configured within the base container such that an upper end of each of the looped inner walls are proximate to each other. In an expanded configuration the upper ends of each looped inner wall are distal from each other. A lid is configured to attach to the base container when the system is in a collapsed configuration.

16 Claims, 11 Drawing Sheets

PORTABLE ANIMAL LITTER SYSTEM

CROSS-REFERENCE TO RELATED APPLICATIONS

This application claims the benefit of the filing date of U.S. Provisional Application Ser. No. 62/472,149 titled "PORTABLE ANIMAL LITTER SYSTEM" and filed on Mar. 16, 2017 and the subject matter of which is incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present invention relates to containers, and more specifically for containers for use with animal litter.

BACKGROUND

Throughout history people have enjoyed domesticated animals as a form of companionship as well as for functional purposes. All over the world decorative images of pets and other animals can be seen on pottery, along the walls of living areas and tombs. Currently, the pet industry is a multi billion-dollar industry in the United States alone.

Domesticated cat related products comprise a significant portion of the multi-billion-dollar industry. People enjoy the companionship of their pets to the extent that many people choose to travel with their pets. However, one of the major issues with traveling with pets is that traveling with pets requires taking bulky equipment used to accommodate their animals.

Cats also have additional issues. In many modern societies, people use containers known as "litter boxes" as an indoor feces and urine collection box. Litter boxes may also be used for rabbits, ferrets, micro pigs, small dogs and other pets that instinctively or through training will make use of a litter box as a repository.

Litter boxes can have a bad odor. Additionally, the material in the litter box where animal feces and urine are collected must be contained from inadvertent removal. Travel with litter boxes creates a significant issue for many pet owners. One major issue is that litter boxes can have a bad odor. Additionally, the bulky nature of litter boxes creates a hardship and an inconvenience for people who need, or want, their pets to accompany them as travel companions. Lastly one particular growing necessity is travel with Service Animals and Emotional Support Pets.

Additionally, the pet industry and pet shelters require transportation and transporting of pets between shelters. Also, during natural disasters an increasing amount of pet-friendly shelters accommodate evacuees that are allowed to bring pets to the shelters. Currently, none of the prior art has any way of transporting large amounts of litter boxes that may be necessary for transporting and housing large numbers of animals.

Prior art has attempted to solve the issues associated with litter boxes. However, many of the solutions taught by the prior art are very time consuming and difficult to assemble. These difficulties and inefficiencies make it very inconvenient for pet owners to travel with pets that require litter boxes. As a result, there exists a need for improvements over the prior art and more particularly a better portable litter box.

SUMMARY

A portable animal litter system is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a portable animal litter system is disclosed. The system includes a base container having a bottom panel and a perimeter wall protruding substantially upward from a perimeter of the bottom panel. A plurality of looped inner walls are positioned concentrically so that the looped inner walls are in a telescoping arrangement. In a fully collapsed state, the looped inner walls are configured within the base container such that an upper end of each of the looped inner walls are proximate to each other. In an expanded configuration the upper ends of each looped inner wall are distal from each other. A lid is configured to attach to the base container when the system is in a collapsed configuration.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1:
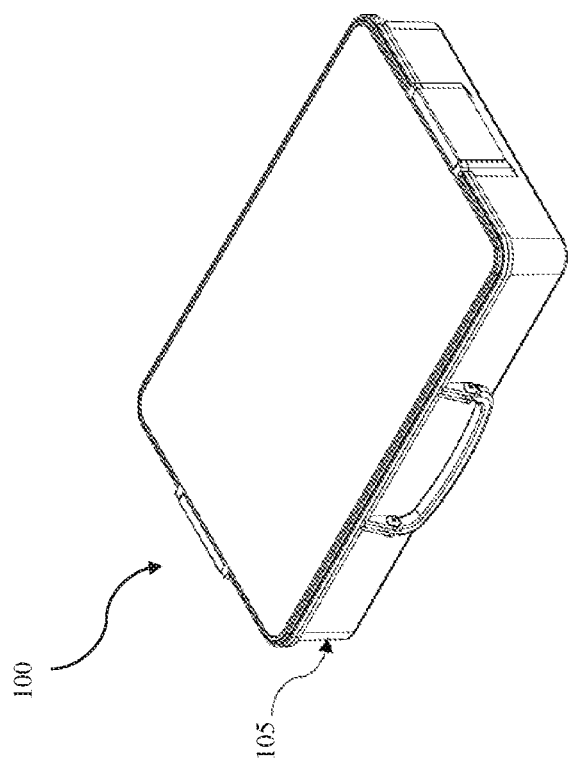
FIG. 1 is a perspective view of a portable animal litter system in fully collapsed configuration having a lid attached thereto, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a litter box with collapsible or telescoping walls. The telescoping walls make it very convenient for animal owners to travel with their pets. Additionally, the disclosed embodiments improve over the prior art by providing a more space efficient litter box that may conveniently fit within an animal carrier. Additionally, the disclosed embodiments improve upon the prior art by providing, in the collapsed configuration a litter box that may be used for animal carriers. Another advantage of the present invention over the prior art is that a user can quickly expand and then collapse and tightly seal with a secure lid the telescoping walls which is much more efficient than the prior art. Another advantage of the existing system is that they can be easily stacked and stored and quickly converted into full size litter boxes as soon as the need arises.

Referring now to the Figures, the disclosed embodiments disclose a portable animal litter system 100. The system includes a base container 105. The base container has a bottom panel 110 and a perimeter wall 115 protruding substantially upward from a perimeter of the bottom panel. In the present embodiment, the bottom panel is a substantially planar shaped body that is rectangular in shape. However, it is understood that other shapes may also be used and are within the spirt and scope of the present invention. The bottom panel may comprise polymeric materials, wood, metallic materials, alloys or any combination thereof. The bottom panel may be formed from a single piece or from several individual pieces joined or coupled together.

The perimeter wall 115 extends substantially upward from the perimeter of the base container. The perimeter wall and the bottom panel may be formed from a single piece or from several individual pieces joined or coupled together. The components of the perimeter wall and the bottom may be manufactured from a variety of different processes including an extrusion process, a mold, welding, shearing, punching welding, folding etc. The base container is sized such that animal litter or bedding may be carried within the base container.

The substances used for animal litter may vary depending on the animal. In one embodiment, the material may be an absorbent material, typically in granular form, used to line a shallow receptacle in which an animal may urinate and defecate when indoors. In other embodiments, the substance or material may be bedding material such as wood shavings, hay, grass, artificial turf, pet training pads and other materials that those skilled in the art may use as bedding for animals and for animal waste elimination purposes.

Figure 2:
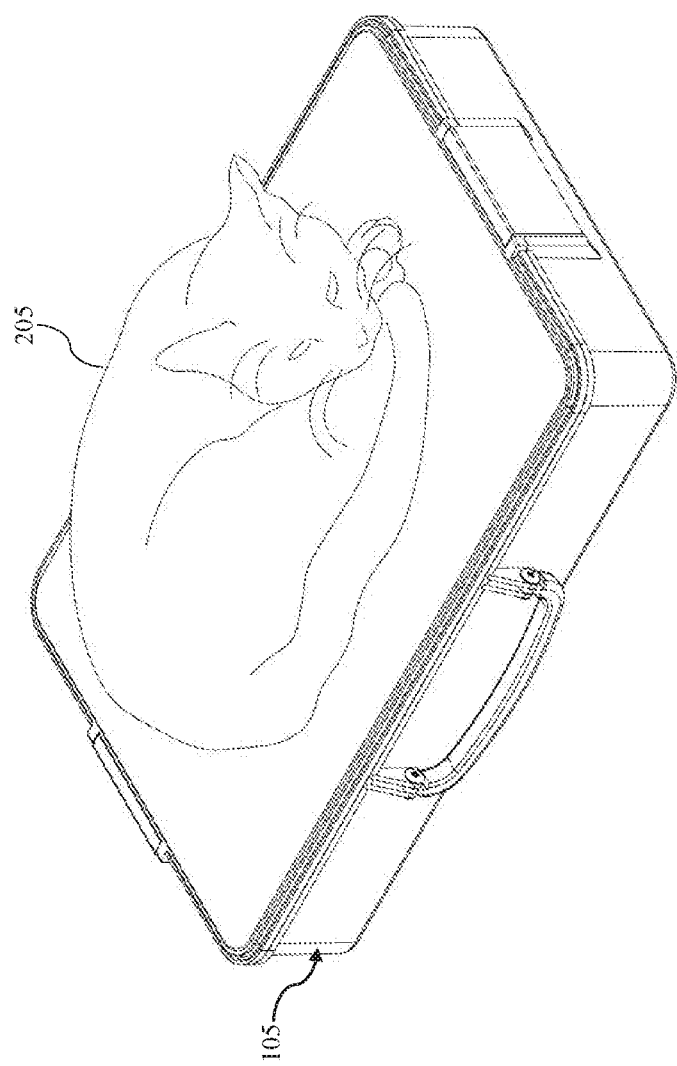
FIG. 2 is a perspective view of the portable animal litter system in fully collapsed configuration having the lid attached thereto and an animal resting on the lid, according to an example embodiment.
Figure 3:
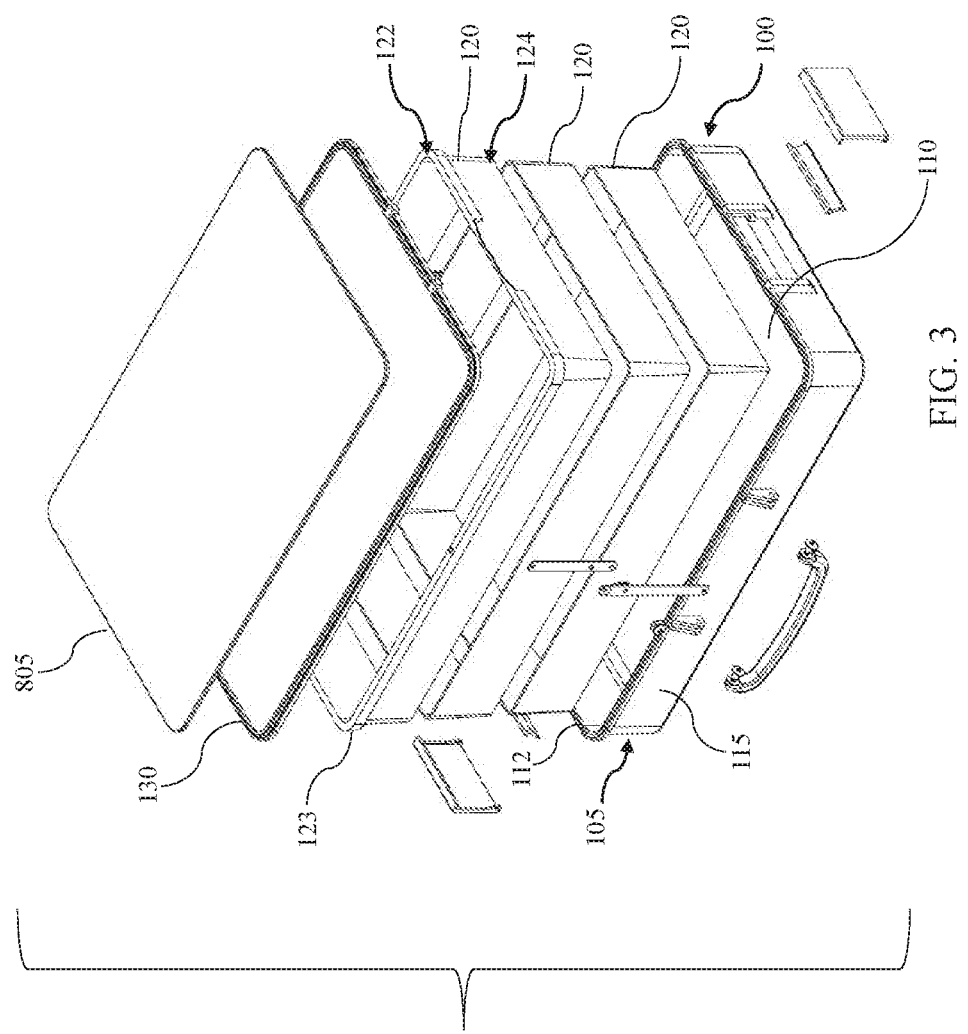
FIG. 3 is an exploded perspective view of the portable animal litter system, according to an example embodiment.
Figure 4:
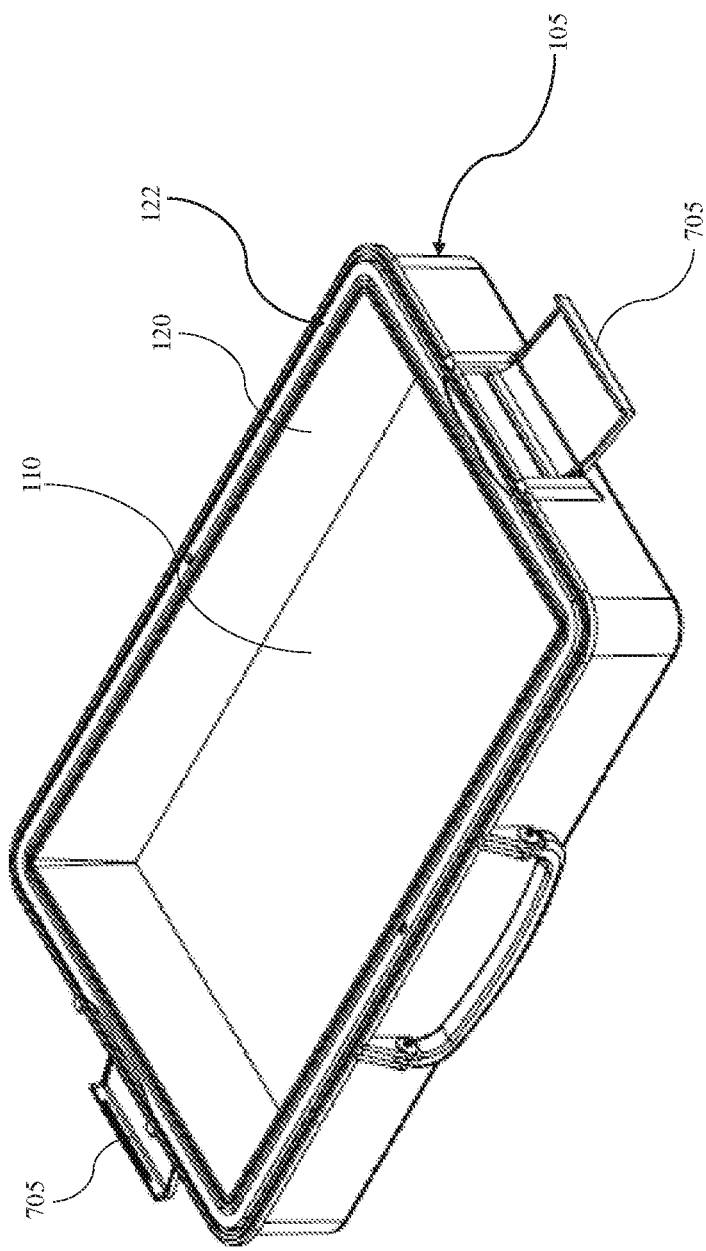
FIG. 4 is a perspective view of the portable animal litter system in fully collapsed configuration without lid attached thereto, according to an example embodiment.
Figure 7:
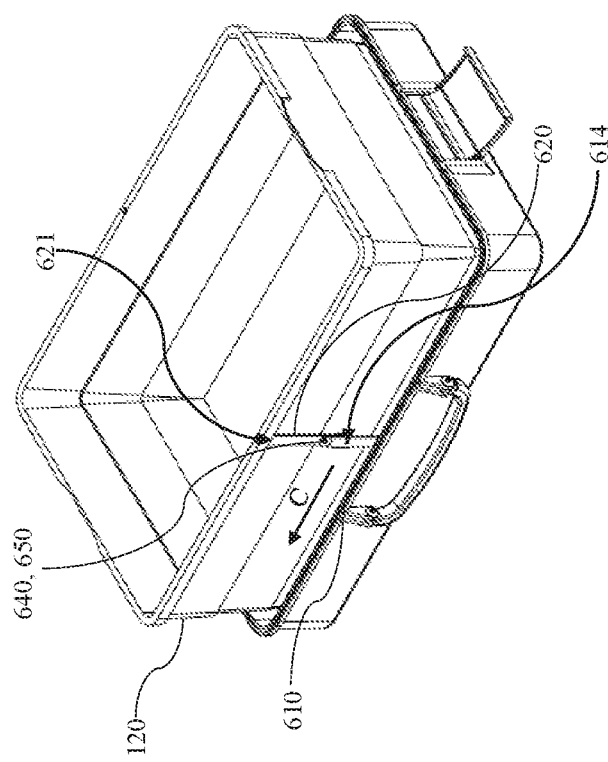
FIG. 7 is a perspective view of the portable animal litter system in fully expanded configuration without lid attached thereto, according to an example embodiment.

Looped inner walls 120 are positioned concentrically so that the looped inner walls are in a telescoping arrangement. In the present embodiment, looped inner walls form a rectangular shaped loop. However, it is understood that other shapes may also be used and are within the spirit and scope of the present invention. In a fully collapsed state or configuration the looped inner walls are configured within the base container 105 such that an upper end 122 of each of the looped inner walls are proximate to each other as illustrated in FIG. 4. In the fully collapsed configuration, the edges 123 of the upper ends 122 of the looped inner walls are below the top edge 112 of the perimeter wall such that a lid 130 can be attached to or be received by the perimeter wall of the base container (as illustrated in FIGS. 1 and 2). In fully expanded configuration, as illustrated in FIG. 7, the upper ends 122 of each looped inner wall are distal from each other.

In the present embodiment, a lid 130 may be attached to the perimeter wall 115 of the base container. In one embodiment, the lid is a planar shaped body having a curved edge. The curved edge is configured for mating with a curved edge 112 of the perimeter wall of the base container via a snap fit. Additionally, latches 705 attached to the perimeter wall of the base container may be used to attach and maintain the lid onto the base container such that the contents inside the base container remain inside the system. In the present embodiment, the system uses two latches. However, it is understood that more latches may also be used to provide forces for retaining the lid onto the perimeter wall. When the lid is attached to the perimeter wall, contents inside the box remain inside.

In the present embodiment, the system also includes a pad 805. The pad can be planar shaped pad that covers an area inside a ridge 810 that runs along proximate to a circumference of the lid. The pad may be comprised materials providing comfort for an animal to rest on top of. For example, the pad may comprise materials such as foam, rubber, plastic like materials, cotton, brushed cotton, chintz, synthetics, etc. However, it is understood that other types of materials may also be used and are within the spirit and scope of the present invention.

Figure 4A:
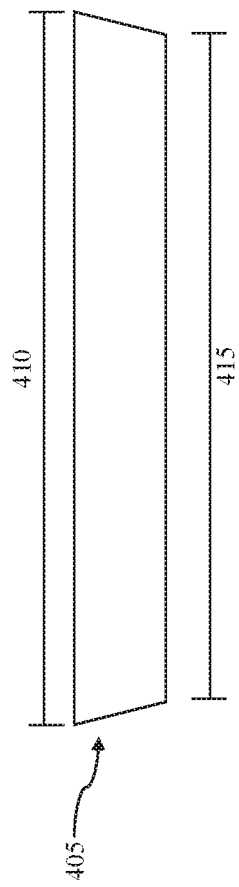
FIG. 4A is a side view of a looped inner wall of the portable animal litter system, according to an example embodiment.
Figure 4B:
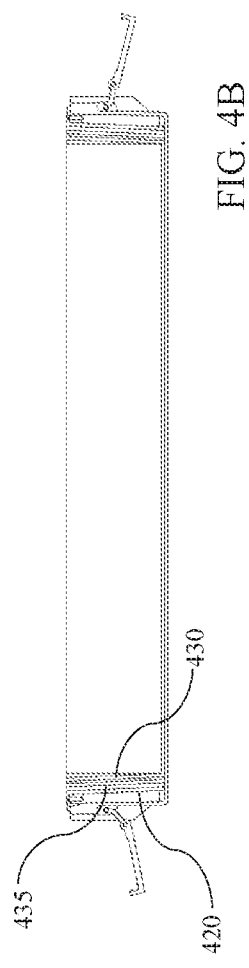
FIG. 4B is a side view of the portable animal litter system in the fully collapsed configuration illustrating the tapered outside cross-sectional diameter of the looped inner walls, according to an example embodiment.
Figure 4C:
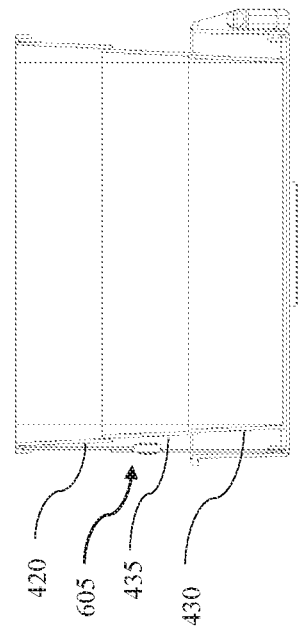
FIG. 4C is a side view of the portable animal litter system in the fully expanded configuration illustrating the tapered outside cross-sectional diameter of the looped inner walls and the lock in the locked configuration, according to an example embodiment.

FIG. 4A-4C are side perspective views of looped inner walls. FIG. 4A is a side view of a looped inner wall, according to an example embodiment. As illustrated in FIG. 4A-4C, each of the looped inner walls is tapered such that the outside cross-sectional diameter 410 at the upper end of each looped inner wall 405 is greater than the outside cross-sectional diameter 415 at the lower end of each looped inner wall. Such tapering of the outside cross-sectional diameter allows for the telescoping arrangement. FIG. 4B is a side view of the looped inner walls in the fully collapsed configuration. As illustrated in the fully collapsed configuration or state in FIG. 4B, the looped inner walls the upper ends 122 of each of the looped inner walls are proximate to each other. In the fully expanded configuration, the tapered outside cross-sectional diameter allows the looped inner walls to telescope such that the upper ends of the looped inner walls are positioned away from or distal to the lower ends of the looped inner walls. FIG. 4C is a side view of the portable animal litter system in the fully expanded configuration illustrating the tapered outside cross-sectional diameter of the looped inner walls and the lock 605 in the locked configuration. In an expanded configuration an upper end of the outermost looped inner wall is above the base container.

Figure 8:
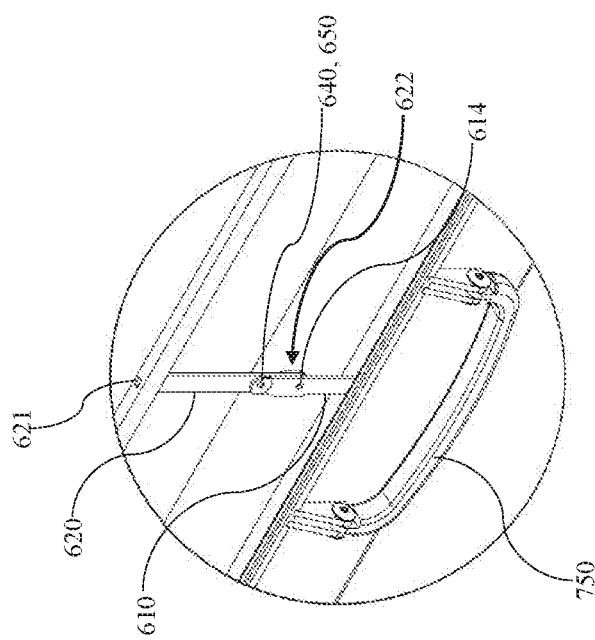
FIG. 8 is a perspective view of the lock of portable animal litter system in the fully expanded configuration, according to an example embodiment.

Referring to FIGS. 7 and 8, in the fully expanded configuration the looped inner walls and the base container form a litter box. In the expanded configuration the increased height of the telescoped wall created by the looped inner walls creates a litter box for animals. The increased height of the telescoped walls prevents litter and other substances from leaving the system. For example, for cats, the increased height of the fully expanded configuration prevents litter from leaving the system when a cat uses the litter box. Additionally, another inventive feature is that the looped inner walls in both the fully collapsed and expanded configuration, the base container can hold animal litter or bedding and can be used by animal. This fact is important because in the fully collapsed configuration the system can be positioned on the bottom of an animal carrier to carry animal bedding and litter for animals to use. Each of the looped inner walls may comprises polymeric materials, wood, metallic materials, alloys or any combination thereof. The looped inner walls may be formed from a single piece or from several individual pieces joined or coupled together. The components of the system may be manufactured from a variety of different processes including an extrusion process, a mold, welding, shearing, punching welding, folding etc.

Figure 5:
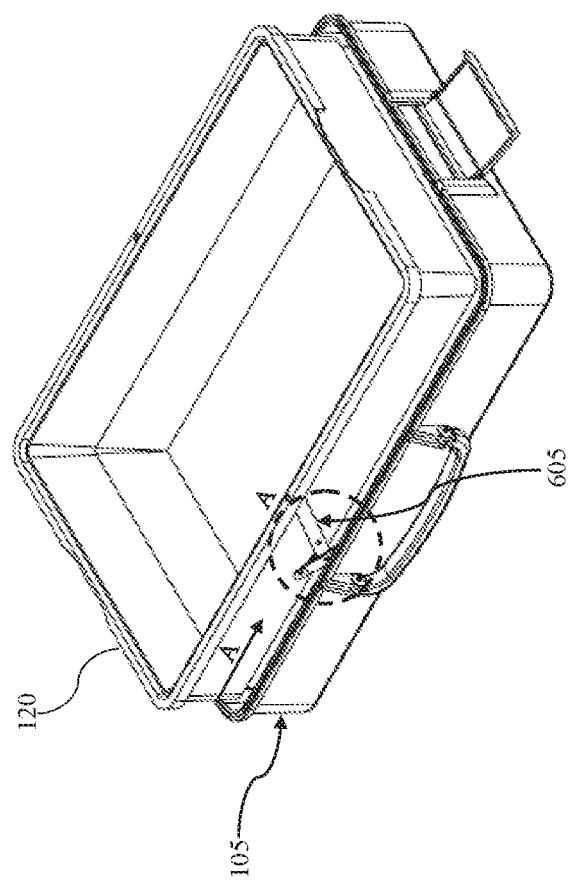
FIG. 5 is a perspective view of the portable animal litter system in the partially expanded configuration, according to an example embodiment.
Figure 6:
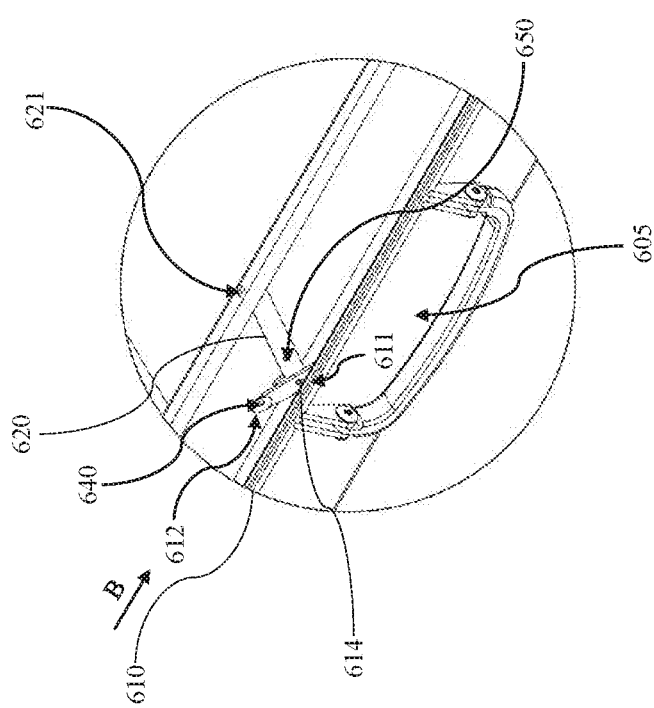
FIG. 6 is a zoomed in perspective view of a lock of the portable animal litter system in the partially expanded configuration, according to an example embodiment.
Figure 9:
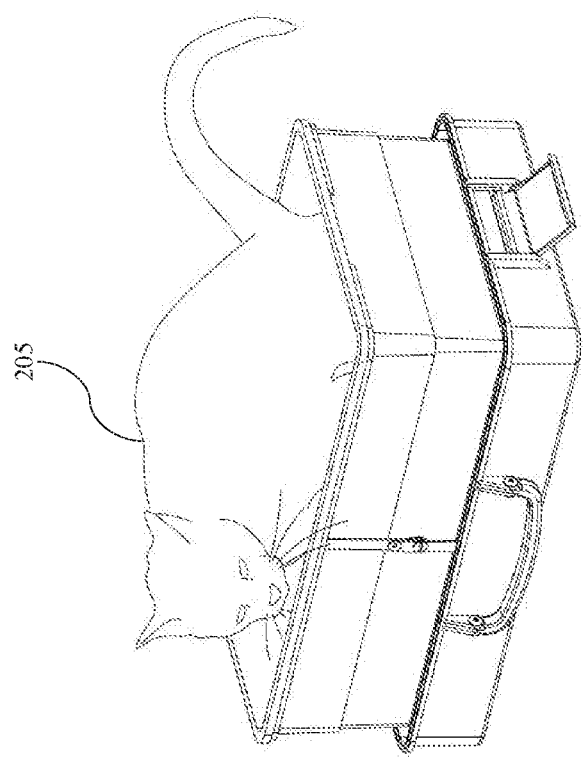
FIG. 9 is a perspective view of the portable animal litter system in the fully expanded configuration having an animal positioned therein, according to an example embodiment.

The system also includes a lock 605 for maintaining the system in the expanded configuration. The lock has a first arm 610 having a first arm first end 611 and a first arm second end 612. The lock has a second arm 620 having a second arm first end 621 and a second arm second end 622. In the present embodiment, each arm is planar shaped elongated element. The first arm is configured to pivotally connect at a pivot point 614 with the second arm. In the present embodiment, first end 611 of the first arm is pivotally connected to the perimeter wall of the base container at a pivot point 614 by a pin or other fastener that allows the first arm to pivot relative to the base container. The second end of the first arm 612 is pivotally connected to the second end 622 of the second arm at a pivot point 614 by a pin or other fastener that allows the first arm to pivot relative to second arm (see e.g., FIGS. 6-9). The first end 621 of the second arm is pivotally connected to an outermost looped inner wall such that the first arm and second arm move between a vertically orientated position (as illustrated in FIGS. 8 and 9) and a non-vertically orientated position (as illustrated in FIGS. 5 and 6).

In the vertically oriented position the lock is configured to maintain the looped inner walls in the fully expanded configuration. A first detent 640 on the first arm is configured to mate with a second detent 650 on the second arm when in the vertically orientated position for locking the first arm relative to the second arm. In the present embodiment, each detent may be a protrusion or depression that is configured to mate with the corresponding depression or protrusion. In operation, the first and second arms are positioned proximate to each other such that when the first and second arms are rotated from the non-vertically aligned configuration (as illustrated in FIG. 6) to the vertically aligned position (as illustrated in FIGS. 8 and 9), an inward force in the direction of line A is required to move the protrusion over the body of the arm and into the depression. When the protrusion is positioned into depression (as illustrated in FIGS. 8 and 9), a threshold force in the direction of line B is required to the protrusion out of the depression and over the body of the arm so that the arms move from the vertically aligned configuration to the non-vertical configuration. Each of the arms of the lock may comprises polymeric materials, wood, metallic materials, alloys or any combination thereof. The arms may be formed from a single piece or from several individual pieces joined or coupled together. The arms may be manufactured from a variety of different processes including an extrusion process, a mold, welding, shearing, punching welding, folding etc. Additionally, it is understood that other means for maintaining the looped inner walls may also be used that are within the spirit and scope of the present invention. In certain embodiments, a liner, such as a resealable elasticized plastic bag, may be positioned inside the base container so that the loose litter or other items may not clog the looped inner walls, which decreases the probability that the loose litter or other items will prevent the looped inner walls from collapsing or expanding.

One of the inventive features of the invention is that the lock and the telescoping feature of the looped inner walls provides an easy way to move between the collapsed configuration and the expanded configuration while the system is inserted in an animal carrier or small spaces. Additionally, the lock adequately maintains the looped inner walls in the fully expanded configuration when animals use the system and use the system in small spaces. The looped inner walls and telescoping arrangement also provide a space saving feature that does not exist in the prior art. Much of the prior art cannot be used, operated or opened easily when the litter boxes are in small spaces or within animal carriers. Additionally, the telescoping arrangement also allows numerous systems to be stacked on top of each other thus providing a space saving characteristic of having numerous systems that require minimal space and that walls that can be moved from the fully collapsed configuration to a fully expanded configuration.

Figure 10:
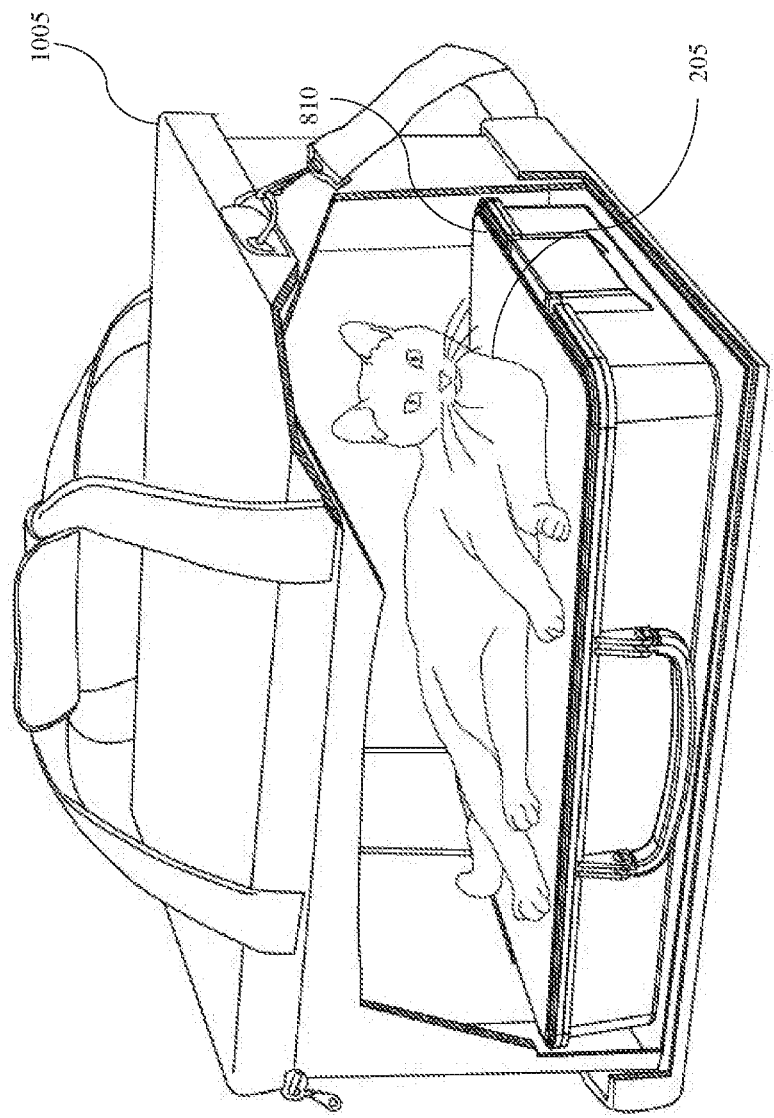
FIG. 10 is a perspective partially cutoff view of the portable animal litter system in the fully collapsed configuration with the lid attached thereto and positioned within an animal carrier, according to an example embodiment.

FIG. 10 is a perspective partially cutoff view of the portable animal litter system in the fully collapsed configuration with the lid attached thereto and positioned within an animal carrier 1005 and having an animal 205 on top of the lid, according to an example embodiment. The portable animal litter system is configured to be positioned inside of an animal carrier when the portable animal litter system is in a collapsed configuration. One of the important features is that in the fully collapsed configuration and without the lid (similar to FIG. 4), the portable animal litter system may still be used such that the animal may use the system during transport. For example, a user may configure the system as illustrated in FIG. 10 so that a cat or other animal may rest on top of the lid during travel. Additionally, if the animal needs to use the litter box while inside an animal carrier, the user may remove the lid and configure the system in the fully collapsed configuration without the lid attached thereto (as illustrated in FIG. 4). This is inventive because multiple configurations may be used within the litter box (fully collapsed configuration with lid, fully collapsed configuration without lid allowing access to inside litter box, and fully expanded configuration without lid) which allows for use of the litter box by multiple types of animals for multiple types of uses. Another inventive feature is that a user, because of the telescoping looped inner walls, may move between the fully collapsed configuration to expanded configurations with the animal in the base container and while within the animal carrier.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A portable animal litter system comprising:
   a base container having a bottom panel and a perimeter wall protruding substantially upward from a perimeter of the bottom panel;
   a plurality of looped inner walls, the plurality of looped inner walls positioned concentrically so that the looped inner walls are in a telescoping arrangement;
      wherein a first outside cross-sectional diameter at an upper end of each of the plurality of looped inner walls is greater than a second outside cross-sectional diameter at a lower end of the respective looped inner wall of the plurality of looped inner walls;
      wherein the plurality of looped inner walls comprises an outermost looped inner wall;
   a radially outward facing lip protruding from an upper end of the outermost looped inner wall for moving the plurality of looped inner walls between a fully collapsed configuration and a fully expanded configuration;
   wherein in the fully collapsed configuration the looped inner walls are vertically orientated and are configured within the base container such that the upper end of each of the plurality of looped inner walls are proximate to each other and the lower end of each of the plurality of looped inner walls are proximate to each other;
   wherein in the fully expanded configuration the upper ends of the plurality of looped inner walls are distal from each other;
   a removable lid configured to attach to the base container when the portable animal litter system is in the collapsed configuration;
   a first unobstructed volume spanning inward from each inward facing side of an inner most looped inner wall for defecation by an animal below an upper end of the perimeter wall base container in the fully collapsed configuration; and,
   a second unobstructed volume spanning inward from each inward facing side of an inner most looped inner wall and the perimeter wall for defecation by an animal in the fully expanded configuration.

2. The portable animal litter system of claim 1, wherein a lock is for maintaining the portable animal litter system in the fully expanded configuration and comprises:
   a first arm having a first arm first end and a first arm second end;
   a second arm having a second arm first end and a second arm second end;
   wherein the first arm first end is pivotally connected to the base container at a first exterior location, the first arm second end is pivotally connected to the second arm second end, and wherein the second arm first end is pivotally connected to the outermost looped inner wall at a second exterior location such that the first arm and second arm move between a vertically orientated position and a non-vertically orientated position; and,
   a first detent on the first arm configured to mate with a second detent on the second arm when in the vertically orientated position for locking the first arm relative to the second arm.

3. The portable animal litter system of claim 1, wherein in the fully expanded configuration, the looped inner walls and the base container form a litter box without a lid.

4. The portable animal litter system of claim 1, wherein in the fully collapsed configuration the upper ends of each of the plurality of looped inner walls are below the perimeter wall of the base container so that the perimeter wall may receive the lid.

5. The portable animal litter system of claim 1, wherein at least one latch attached to the perimeter wall removably couples the lid to the base container.

6. The portable animal litter system of claim 1, wherein contents inside the portable animal litter system remain inside portable animal litter system when in the fully collapsed configuration with the lid attached to the base container.

7. The portable animal litter system of claim 1, wherein the portable animal litter system is configured to be positioned inside of an animal carrier when the portable animal litter system is in the fully collapsed configuration.

8. The portable animal litter system of claim 1, wherein a pad covers an area inside a ridge that runs along proximate to a circumference of the lid.

9. A portable animal litter system comprising:
   a base container having a bottom panel and a perimeter wall protruding upward from a bottom panel perimeter to define a top opening;
   a plurality of looped inner walls, the plurality of looped inner walls are positioned concentrically so that the looped inner walls are in a telescoping arrangement such that the plurality of looped inner walls define a common looped inner wall top opening, where a first outside cross-sectional diameter at an upper end of each of the plurality of looped inner walls is greater than a second outside cross-sectional diameter at a lower end of the respective looped inner wall of the plurality of looped inner walls;
   wherein a top opening of the base container and the common looped inner wall top opening share a common central axis;
   wherein in a fully collapsed configuration the looped inner walls are vertically orientated and are configured within the base container such that the upper end of each of the looped inner walls are proximate to each other and the lower end of each looped wall are proximate to each other; and,
   wherein in a fully expanded configuration an upper end of an outermost looped inner wall is above the base container;
   wherein the portable animal litter system is also configured for defecation by an animal below an upper end of the perimeter wall of the base container in the fully collapsed configuration; and, wherein the portable animal litter system is also configured for defecation by the animal within the base container in the fully expanded configuration;

wherein when in the fully expanded configuration the portable animal litter system is configured such that the animal enters and leaves through the top opening of the base container and the common looped inner wall top opening;

wherein when in the fully collapsed configuration the portable animal litter system is configured such that the animal enters and leaves through the top opening of the base container and the common looped inner wall top opening; and, where a carrying container fully encloses the base container, the looped inner walls and a lid in both the fully expanded configuration and the fully collapsed configuration such that a third unobstructed volume is defined between an upper wall portion of the carrying container and the base container in the fully collapsed configuration;

a pair of handles attached to an upper end of the carrying container for carrying the base container, looped inner walls and the lid in both the fully expanded configuration and the fully collapsed configuration.

10. The portable animal litter system of claim 9, wherein a lock is for maintaining the portable animal litter system in the fully expanded configuration and comprises:
   a first arm having a first arm first end and a first arm second end;
   a second arm having a second arm first end and a second arm second end;
   wherein the first arm first end is pivotally connected to the base container at a first exterior location, the first arm second end is pivotally connected to the second arm second end, and wherein the second arm first end is pivotally connected to an outermost looped inner wall at a second exterior location, such that the first arm and second arm move between a vertically orientated position and a non-vertically orientated position; and,
   a first detent on the first arm configured to mate with a second detent on the second arm when in the vertically orientated position for locking the first arm relative to the second arm.

11. The portable animal litter system of claim 9, wherein a lid is configured to attach to the base container when the portable animal litter system is in the fully collapsed configuration.

12. The portable animal litter system of claim 11, wherein in the fully collapsed configuration, the upper ends of each of the plurality of looped inner walls are below the perimeter wall of the base container so that the perimeter wall may receive the lid.

13. The portable animal litter system of claim 12, wherein at least one latch attached to the perimeter wall of the base container is configured to removably couple the lid to the perimeter wall via a snap fit.

14. A portable animal litter system comprising:
   a base container having a bottom panel and a perimeter wall protruding substantially upward from a perimeter of the bottom panel;
   a plurality of looped inner walls, wherein a first outside cross-sectional diameter at an upper end of each of the plurality of looped inner walls is greater than a second outside cross-sectional diameter at a lower end of the respective looped inner wall of the plurality of looped inner walls, and wherein the looped inner walls are positioned concentrically so that the looped inner walls are in a telescoping arrangement;
   wherein in a fully collapsed configuration the looped inner walls are vertically orientated and are configured within the base container such that the upper end of each the looped inner walls are proximate to each other and the lower end of each looped inner walls are proximate to each other;
   wherein in a fully expanded configuration the upper end of an outermost looped inner wall is above the base container;
   wherein the portable animal litter system is also configured for use by an animal in the fully collapsed configuration;
   a removable lid configured to attach to the base container when the portable animal litter system is in the fully collapsed configuration;
   a first unobstructed volume spanning inward from each inward facing side of an inner most looped inner wall for defecation by an animal below an upper end of the perimeter wall of the base container in the fully collapsed configuration;
   a second unobstructed volume spanning inward from each inward facing side of an inner most looped inner wall and the perimeter wall for defecation by an animal in the fully expanded configuration; and,
   where a carrying container configured to be carried by hand fully encloses the base container, the looped inner walls and the lid in both the fully expanded configuration and the fully collapsed configuration such that a third unobstructed volume is defined between an upper wall portion of the carrying container and the base container in the fully collapsed configuration.

15. The portable animal litter system of claim 14, wherein in the fully collapsed configuration, the upper ends of each of the plurality of looped inner walls are below the perimeter wall of the base container so that the perimeter wall may receive the lid.

16. The portable animal litter system of claim 14, wherein a lock is for maintaining the portable animal litter system in the fully expanded configuration and comprises:
   a first arm having a first arm first end and a first arm second end;
   a second arm having a second arm first end and a second arm second end;
   wherein the first arm first end is pivotally connected to the base container and the first arm second end is pivotally connected to the second arm second end and wherein the second arm first end is pivotally connected to an outermost looped inner wall such that the first arm and second arm move between a vertically orientated position and a non-vertically orientated position; and,
   a first detent on the first arm configured to mate with a second detent on the second arm when in the vertically orientated position for locking the first arm relative to the second arm.

* * * * *